United States Patent [19]
Aquila

[11] 3,719,294
[45] March 6, 1973

[54] TOW BAR APPARATUS

[76] Inventor: Joseph Aquila, 144-41 231st Street, Rosedale, N.Y. 11422

[22] Filed: Nov. 9, 1970

[21] Appl. No.: 87,863

[52] U.S. Cl. ..............................214/86 A, 280/402
[51] Int. Cl. ................................................B60p 3/12
[58] Field of Search............214/86 A, 146.5; 280/402

[56] References Cited

UNITED STATES PATENTS

| | | | |
|---|---|---|---|
| 2,449,146 | 9/1948 | Ryan | 214/86 A |
| 2,625,279 | 1/1953 | Dalby et al. | 214/86 A |
| 3,313,432 | 4/1967 | Sheldrew | 214/86 A X |
| 2,197,406 | 4/1940 | Fleming et al. | 214/86 A |
| 2,951,601 | 9/1960 | Castoe | 214/86 A |
| 2,145,378 | 1/1939 | Trippensee | 214/86 A X |
| 2,436,000 | 2/1948 | Fleming | 214/86 A |
| 3,522,892 | 8/1970 | Vegors | 214/86 A |

*Primary Examiner*—Albert J. Makay
*Attorney*—Ostrolenk, Faber, Gerb & Soffen

[57] ABSTRACT

A truck-mounted towing crane is constructed with a tubular boom pivoted at one end and raised by a power cylinder. A tow bar assembly is pivotally mounted to the other end of the boom so that the former may be folded back to a storage position and the boom lowered for storage of the crane in a small space. The tow bar assembly includes a downward and rearward extension for the boom and a cross-bar supported from below at its center by a ball joint connected to the free end of the boom extension.

8 Claims, 7 Drawing Figures

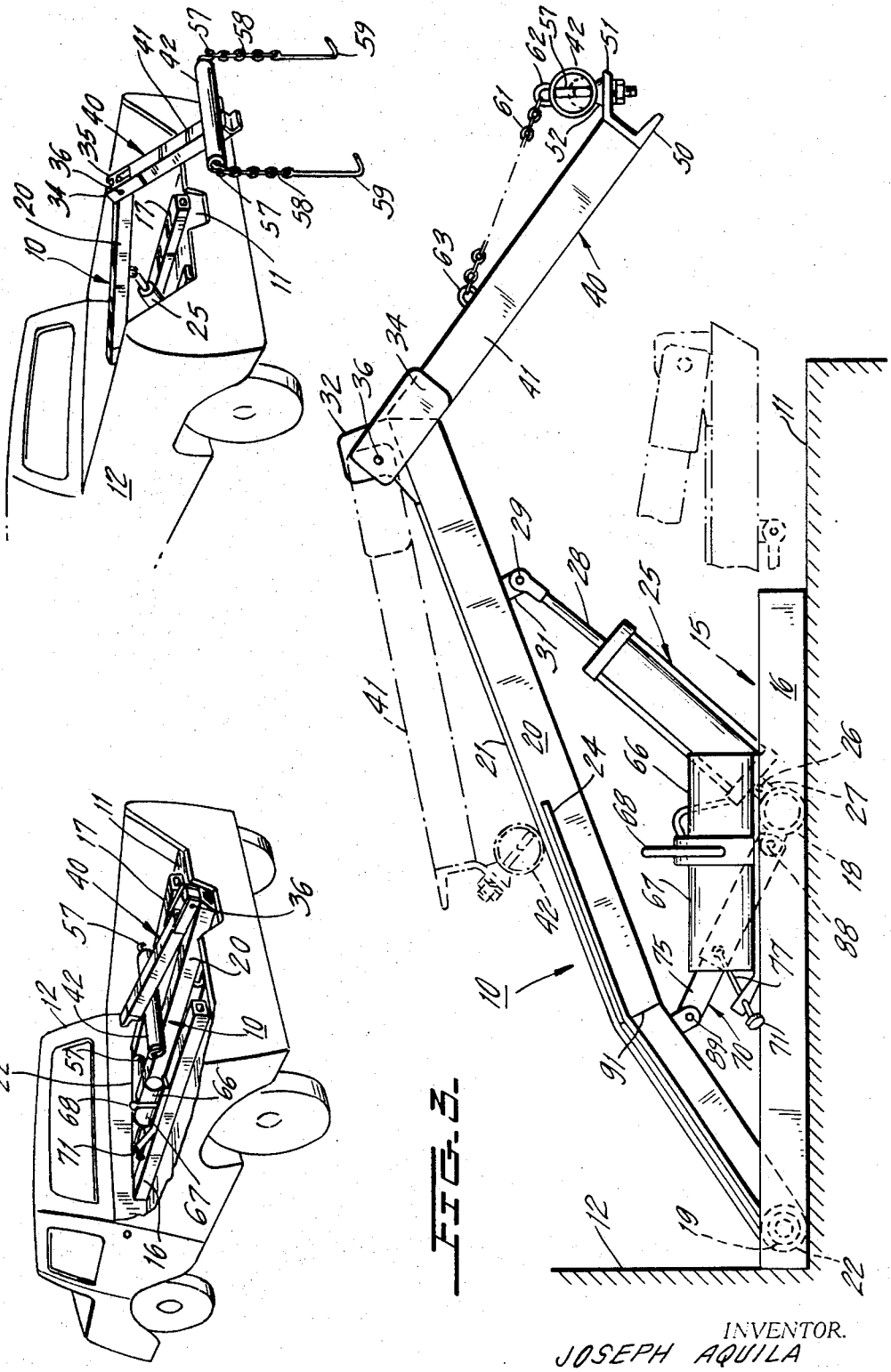

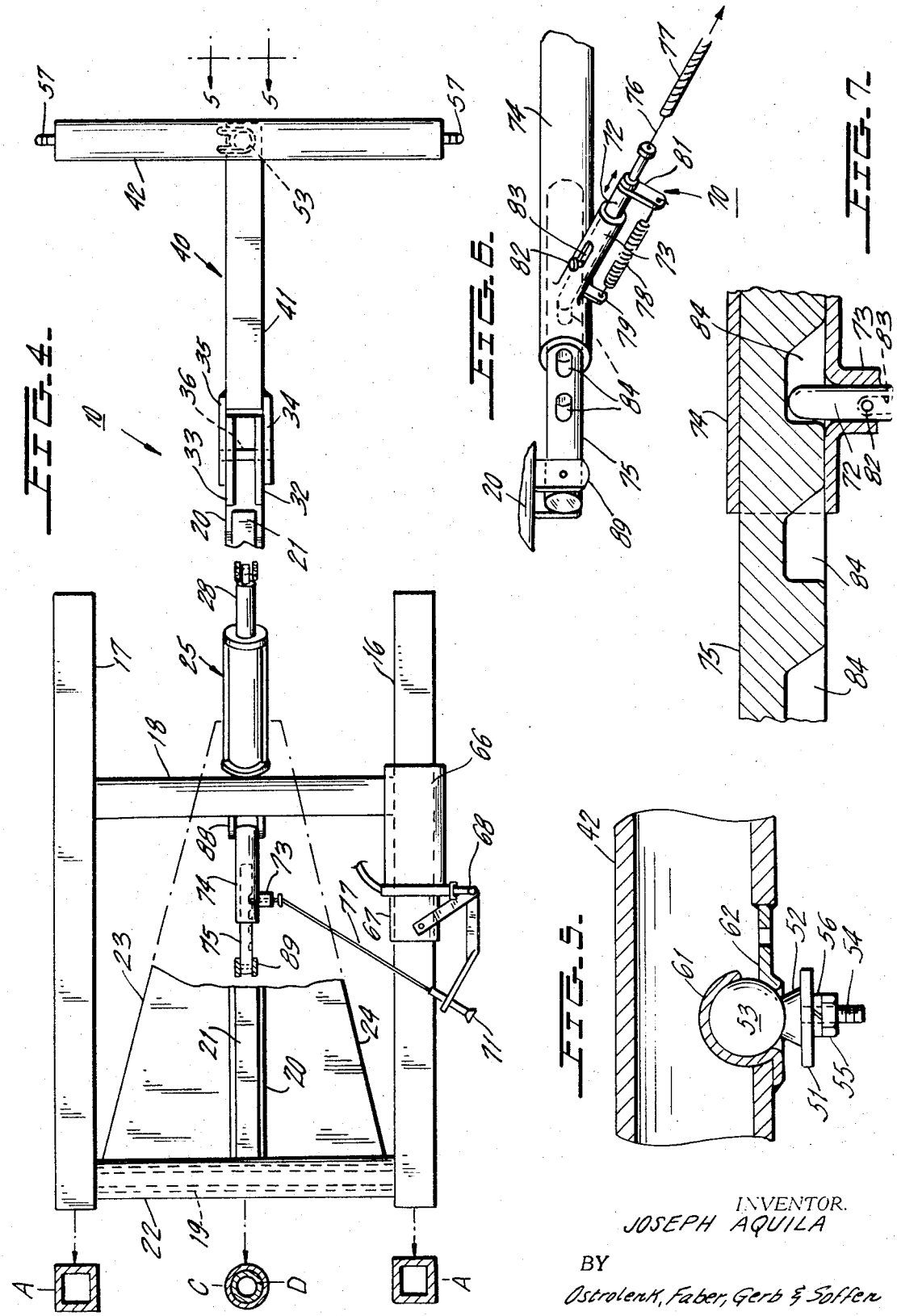

TOW BAR APPARATUS

This invention relates to cranes in general, and more particularly relates to a truck-mounted crane for towing disabled automobiles.

For the most part, prior art truck-mounted cranes for the towing of automobiles included a boom that is raised and lowered by cables extending over a tall gantry. Driving power for the cables was usually supplied by a mechanical connection to the automobile engine and the horizontal tow bar was usually suspended from the free end of the boom by chains or cables.

Prior art cranes of this type have proven to be ineffective when mounted on relatively light duty, so-called pickup, trucks and called upon to tow relatively heavy automobiles, such as Cadillacs and Lincolns. For the most part, difficulties arise because of weight distribution, which on one hand impedes lifting of the automobile, and on the other hand makes the towing vehicle top-heavy, so that there is a great danger of turnover.

These prior art constructions are also disadvantageous in that once the crane structure is mounted on the truck, the bulkiness of the crane structure essentially precludes the truck from being used for any purpose but towing.

In order to overcome the foregoing objectionable features of prior art constructions, the instant invention provides a relatively compact crane structure, which when not being used for towing may be readily collapsed to permit the tow truck to be used for other purposes. In particular, the device of the instant invention comprises a relatively small horizontal base adapted to seat on the floor of a pickup truck body and be bolted or otherwise secured directly to the truck frame.

A tubular boom is pivoted at one end thereof to the base, and is raised and lowered by a hydraulic operated power cylinder, driven by a fluid pump operated by an electric motor. A tow bar assembly is pivotally mounted on the other end of the boom, so as to be movable between a storage and an operating position. In the storage position the tow bar assembly is folded back so as to overlie the boom and be close to the base.

The tow bar assembly includes a boom extension which, in the operating position of the tow bar assembly extends downward and to the rear of the boom. The cross-bar of the tow bar assembly is supported from below by a ball joint connected to the free end of the boom extension.

Accordingly, a primary object of the instant invention is to provide a novel construction for a crane having a tow bar means.

Another object is to provide a crane construction of this type which permits collapse to a relatively compact form when not being used.

Still another object is to provide a tow bar assembly in which the cross-bar is supported from below by a swivel on a boom extension.

A further object is to provide a tow bar assembly in which a ball joint provides for limited universal motion of the cross-bar relative to the boom.

A still further object is to provide a crane construction which makes extensive use of relatively lightweight tubular members.

These objects, as well as other objects of this invention, will become readily apparent after reading the following description of the accompanying drawings, in which:

FIG. 1 is a perspective showing a crane, constructed in accordance with the instant invention, mounted on the bed of a relatively lightweight pickup truck, with the tow bar assembly folded back to a storage position.

FIG. 2 is a fragmentary view of the elements of FIG. 2, with the tow bar assembly in its operating position.

FIG. 3 is a side elevation of the crane elements of FIG. 2.

FIG. 4 is a plan view of the elements of FIG. 3.

FIG. 5 is a cutaway fragmentary view of the ball joint forming elements 5—5, looking in the direction of arrows 5—5 of FIG. 4.

FIG. 6 is a side elevation of the safety device which limits accidental downward movement of the boom.

FIG. 7 is a fragmentary longitudinal cross-section of the main elements of FIG. 6.

Now referring to the FIGS. Crane 10, constructed in accordance with teachings of the instant invention, is intended to rest upon bed 11 of a relatively light duty vehicle or so-called pickup 12 and be secured to the frame thereof by bolts or other suitable means (not shown).

Crane 10 includes horizontal base 15, constructed of spaced side members 16, 17 connected by transverse members 18, 19. Members 16, 17 are tubular and of square cross-section as at A in FIG. 4, and cross members 18, 19 are also tubular but of circular cross-section, being illustrated at C and D, respectively, in FIG. 4. Boom 20 is a unitary tubular member of square cross-section having a hump therein. Reinforcing strip 21 is welded to the upper surface of boom 20 and extends for substantially the entire length thereof. The front end of boom 20 is secured to circular tube 22 at the center thereof, and extends at right angles thereto. Transverse frame member 19 is substantially equal in length to tube 22, being disposed therein and cooperating therewith to form the main pivot for boom 20. Triangular stabilizing plates 23, 24 extend from opposite sides of boom 20, being secured to tube 22 and acting to stabilize boom 20 against movement outside of a plane perpendicular to base 15.

Hydraulically operated power cylinder 25 is pivotally connected at 26 to radial extension of transverse frame member 18. Piston rod 28 extending from the other end of cylinder 25, is pivoted at its free end 29 to downward extension 31 of boom 20 at a point located to the rear of transverse frame member 18. When boom 20 is in its lowermost position, power cylinder 25 extends substantially parallel to base 15 and boom 20 is positioned only slightly thereabove as in FIG. 1.

The rear end of boom 20 is provided with spaced upwardly extending trunion forming elements 32, 33 supporting pin 36 to which tow bar assembly 40 is pivotally mounted. Assembly 40 includes boom extension 41 and cross-bar 42. Boom extension 41 is of the same cross-section as boom 20, and cross bar 42 is a tubular member of circular cross-section. Spaced trunion forming elements 34, 35, secured to opposite side of boom extension 41 at the front thereof, are disposed adjacent to the outer surfaces of elements 32, 33, and are connected to pivot pin 36. In the operating position of crane 10, the engaged angled abutting edges of boom extension 41 and boom 20 position boom extension 41 on an incline extending downwardly and to the rear of boom 20.

Modified U-shaped bracket 50 is welded to the rear end of boom extension 41, and includes generally horizontal leg 51, forming a support for seat 52 upon which swivel joint ball 53 is mounted. Stud 54, extending downward from ball 53 through seat member 52 and bracket arm 51, is engaged by nut 55 to secure ball 53 to bracket 50. Lock washer 56 is interposed between nut 55 and bracket leg 51. Socket forming elements 61, 62 are secured to cross bar 42 at the center thereof, and lock cross bar 42 to ball 53. Elements 61, 62 cooperate to form a spherical socket wherein ball 53 is disposed, to constitute a swivel joint which, for the most part, supports cross bar 42 from below.

Each of the hooks 57 welded at the ends of cross-bar 42, supports a chain 58 having an automobile engaging hook 59 secured to the lower end thereof. Safety chain 61 extends between horseshoes 62, 63, secured to cross!-bar 42 and boom extension 41, respectively. Chain 61 is long enough to permit cross-bar 42 to swivel as required. Yet there is very little slack in chain 61a, so that in the unlikely event that swivel joint 53, 61, 62 breaks, cross-bar 42 remains mechanically connected to boom extension 41 to prevent separation of the towed vehicle (not shown) from the towing vehicle 12.

Rod 28 of power cylinder 25 is extended to raise the rear end of boom 20 by means of fluid pumped into power cylinder by fluid pump 66 operated by battery powered motor 67. Manually operated control 68 is biased to a neutral position, and is selectively operable to two other positions. In one of these positions, motor 67 is energized so that pressure is built up within power cylinder 25 by fluid pump 66 to extend rod 28 and raise the rear end of boom 20. In the other position of control 68, fluid is permitted to escape from power cylinder 25, to the reservoir portion of pump 66, at a controlled rate to gradually lower the rear end of boom 20.

Safety device 70 permits boom 20 to be raised freely, but in the absence of safety control 71 being pulled outward to releasing position, downward movement of boom 20 will be automatically stopped after very limited movement. That is, control 71 is at one end of cable 76 in stiff flexible cover 77. The other end of cable 76 is connected at its other end to locking pin 72, the latter being slidably disposed within transverse tubular guide extension 73 of tube 74 having rod 75 entered into the upper end thereof. The lower end of tube 74 is pivotally connected at 88 to a radial extension at the center of transverse base member 18.

The upper end of rod 75 is pivotally connected to a downward extension of boom 20, located forward of pivot 88 and forward of bend line 91 in boom 20. Tension spring 78 is disposed outside of guide extension 73, being connected to tab 79 projecting from extension 73, and to tab 81 at one end of pin 72, thereby biasing pin 72 toward tube 74 or toward latching position. Radial extension 82 from pin 72 cooperates with longitudinal slot 83 in extension 73 to prevent rotation of pin 72.

Rod 75 is provided with aligned longitudinally spaced locking notches 84, 84, etc., positioned to receive the free end of locking pin 72. As seen in FIG. 7, the left end of notch 84 is substantially parallel to the axis of extension 73, thereby being transverse to the axis of rod 75. The right end of notch 84 is at a substantial incline with respect to the axes of both elements 73 and 75. Thus, with pin 72 in its locking position shown in FIG. 7, movement of rod 75 to the right with respect to tube 74 is blocked. However, rod 75 is free to be withdrawn from tube 74, with the right-hand boundary of notch 84 acting as a cam surface to engage the rounded tip of locking pin 72 and force the latter out of notch 84.

Operation of the apparatus hereinbefore described proceeds as follows. Crane 10 is usually transported in its storage or collapsed position, shown in FIG. 1, wherein tow bar assembly 40 is folded forward about pivot pin 36 to a position wherein boom extension 41 overlies boom 20 and cross-bar 42 rests against the upper surface of bar 21 on boom 20. Piston rod 28 is retracted, and the rear end of boom 20 is in its lowered position adjacent to pickup bed 11.

When pickup 12 arrives at the vicinity of the vehicle to be towed, tow bar assembly 40 is pivoted to the rear about pin 36, to its operating position wherein cross-bar 42 is to the rear of pickup 12 and is initially below bed 11. Hooks 59 are brought into engagement with the vehicle to be towed, and chains 58 slipped into hooks 57. Control 68 is operated to energize motor 67, thereby driving fluid pump 66 and extending cylinder rod 28 to lift the rear end of boom 20 and tow bar assembly 40 attached thereto, thereby raising the vehicle to be towed. Motor 67 is deenergized when boom 20 is generally at the desired towing height. Thereafter, control 68 is operated to exhaust fluid from power cylinder 25 back to the reservoir section of pump 66, with the downward movement of boom 20 being arrested through the cooperation of locking 72 and one of the notches 84. If boom 20 is too low at this time, power cylinder 25 is operated again to raise boom 20 until locking pin 22 falls into an appropriate one of the notches 84, which will hold boom 20 in a required towing position.

When the towed vehicle arrives at its destination, safety lock release control 71 is pulled outward, thereby retracting pin 72 beyond the periphery of rod 75, and control 68 is operated to release fluid from power cylinder 25 and permit lowering of boom 20 until hooks 59 disengage the towed vehicle.

Although not illustrated in detail in the FIGS. or hereinbefore described, it is noted that for the most part the connections between elements subject to major mechanical stresses are made by welding. For examples, socket forming elements 61, 62 are welded to cross-bar 42; member 51 and elements 34, 35 are welded to boom extension 41; elements 32, 33, bar 21 and plates 23, 24 are welded to boom 20; plates 23, 24 are also welded to tube 22; transverse frame or base members 18, 19 are welded to longitudinal frame members 16, 17; and there are welds along bend line 91.

Although in the foregoing there have been described preferred embodiments of this novel invention, many variations and modifications will now become apparent to those skilled in the art, and it is preferred therefore that the instant invention be limited not by the disclosure contained herein but only by the appending claims.

The embodiments of the invention in which an exclusive privilege or property is claimed are defined as follows.

1. A crane including an elongated boom; a main pivot at the front end of said boom; a power operated device connected to said boom from below for raising the rear end thereof; a tow bar assembly including an elongated boom extension and an elongated cross-bar; said boom extension connected at one end thereof to said rear end of said boom to be raised by said power operated device as the latter raises said boom; with said tow bar assembly in a working position said boom extension having its other end positioned below and to the rear of said one end; swivel means connecting said cross-bar at its mid-region to said other end of said boom extension and generally at right angles with respect thereto; a generally horizontal base including spaced elongated side members extending generally parallel to the plane of movement for said boom; said main pivot being positioned at the front of said base; said base also including a transverse member positioned rearward of said main pivot; said power operated device connected between said transverse member and a point on said boom positioned to the rear of said transverse member; said cross-bar being positionable below said base; stabilizing members extending from opposite sides of said boom and connected to said base at the front thereof.

2. A crane as set forth in claim 1, in which said swivel means comprises a device supporting said cross-bar from a point therebelow.

3. A crane as set forth in claim 1, in which said boom, said boom extension, and said cross-bar are each constructed of tubular elements.

4. A crane as set forth in claim 1 also including a safety device connected to said boom to limit lowering thereof in the event there is a malfunction of the power operated device.

5. A crane as set forth in claim 4 in which the safety device comprises first and second telescoping elements, one connected to said boom and the other connected to said base, a retractable locking member carried by one of said elements and biased to be engageably by locking formations of the other of said elements as said boom is being lowered, thereby limiting lowering movement of said boom unless said locking member is retracted.

6. A crane as set forth in claim 1 in which the power operated device comprises fluid cylinder means.

7. A crane including an elongated boom; a main pivot at the front end of said boom; a power operated device connected to said boom from below and comprising the sole means for raising said boom and elements secured to the rear end of said boom for raising the rear end thereof; a tow bar assembly including an elongated boom extension and an elongated cross-bar; said boom extension connected at one end thereof to said rear end of said boom to be raised by said power operated device as the latter raises said boom; with said tow bar assembly in a working position said boom extension having its other end positioned below and to the rear of said one end; swivel means connecting said cross-bar at its mid-region to said other end of said boom extension and generally at right angles with respect thereto; a pivot means connecting said one end of said boom extension directly to said rear end of said boom, said pivot means and said main pivot being parallel to each other and generally parallel to said cross-bar; said tow bar assembly being movable about said pivot means as a center to a storage position, wherein said boom extension overlies said boom, with said other end of said boom extension being forward of said rear end of said boom, and with both said boom and said boom extension being lowered to generally horizontal positions; a generally horizontal base including spaced elongated side members extending generally parallel to the plane of movement for said boom; said main pivot being positioned at the front of said base; said base also including a transverse member positioned rearward of said main pivot; said power operated device connected between said transverse member and a point on said boom positioned to the rear of said transverse member; said cross-bar being positionable below said base.

8. A crane as set forth in claim 7 also including stabilizing members extending from opposite sides of said boom and connected to said base at the front thereof.

* * * * *